May 22, 1945.   O. H. HASSELBAUM   2,376,691
ELECTRICAL CIRCUIT FOR COMBUSTION MOTORS
Filed June 29, 1943   4 Sheets-Sheet 1

Inventor
Oscar H. Hasselbaum
by Ezekiel Wolf
his atty.

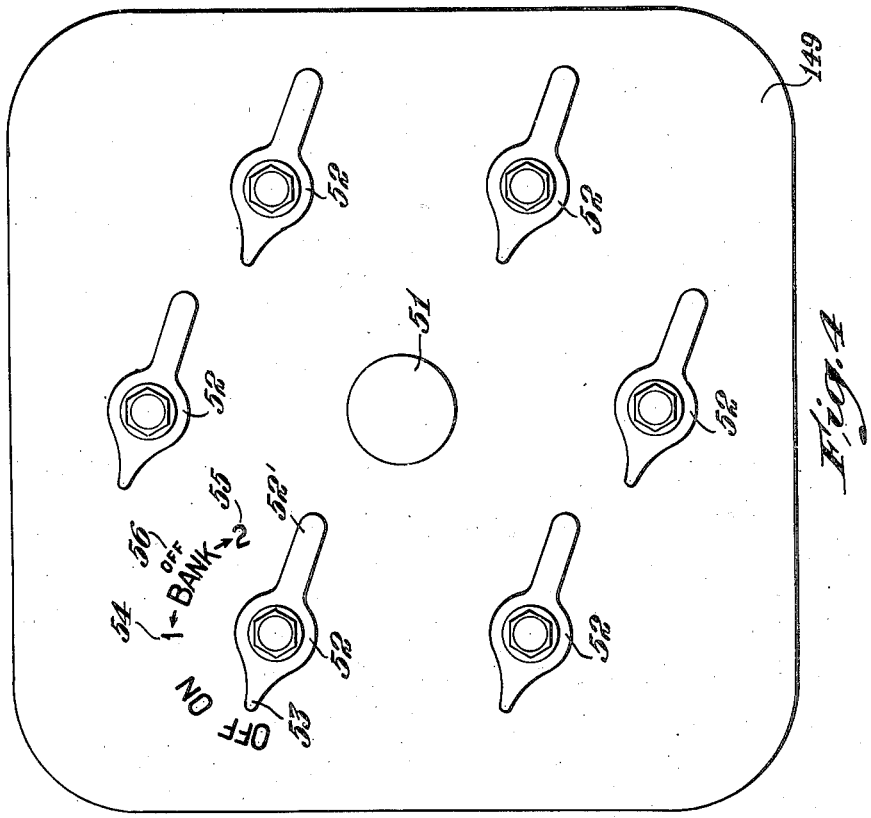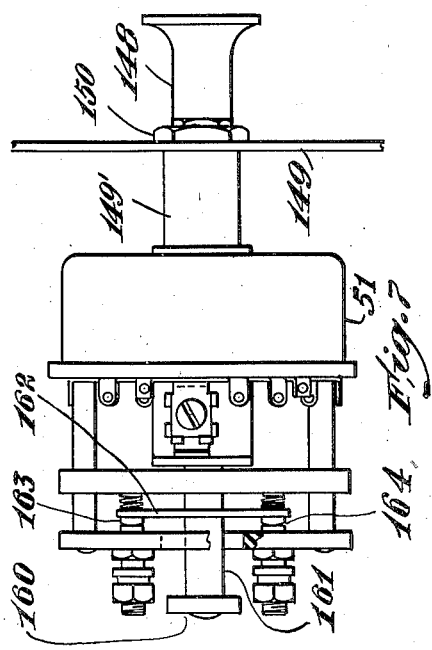

May 22, 1945. O. H. HASSELBAUM 2,376,691
ELECTRICAL CIRCUIT FOR COMBUSTION MOTORS
Filed June 29, 1943 4 Sheets-Sheet 4

Inventor
Oscar H. Hasselbaum
by Ezekiel Wolf
his atty.

Patented May 22, 1945

2,376,691

UNITED STATES PATENT OFFICE 2,376,691

ELECTRICAL CIRCUIT FOR COMBUSTION MOTORS

Oscar H. Hasselbaum, Dorchester, Mass., assignor to Joseph Pollak Corp., Dorchester, Mass., a corporation of Massachusetts Application June 29, 1943, Serial No. 492,749

16 Claims. (Cl. 175—183)

The present invention relates to a circuit and apparatus for remote control operation and testing of a group of internal combustion engines of the type which use electric ignition particularly magnetos, and in particular relates to such a system and apparatus for control and testing of motors on large aircrafts such as commercial transport planes and military planes of bomber and other types.

It is quite usual in such a system where the motors are situated in the wings of the plane that sufficient space is available so that local testing can be cooperated with control by the operator or pilot from the dash switch board.

Rapid testing of the electrical system and the high tension system of each motor is highly essential and this is apt to be complicated by the fact that the motor may have a considerable number of cylinders in which each cylinder is provided with two ignition plugs and one or two magnetos for furnishing high tension voltage to the system. In such systems it is highly desirable to be able to test each magneto and its associate circuit with each plug and by the process of elimination determine whether any of the high tension circuits are operating improperly.

The purpose of the present invention is to provide a remote control and testing system which will accomplish this result and which will permit testing readily and positively to determine where a fault, if any, exists.

The present invention will be described in its adaptation for use with six motors, each motor having two banks of magnetos which may be tested singly by manual operation of ground test switches positioned in the motor bay itself. The arrangement of the system is such and circuits so employed that one bank at least at all times is left running while the test is being made.

The invention will be further described in the specification below in connection with an embodiment of the same illustrating the invention in which:

Figure 1 and Figure 2 taken together show a circuit diagram for one motor, Figure 1 containing the element on the switch panel in the motor bay and Figure 2 the elements on the dash board.

Figure 3 shows a section substantially on the line 3—3 of an element in Figure 2.

Figure 4 shows a front view of the dash panel switch or engineer's control panel.

Figure 7 shows a side view of the master crash switch, a portion of which is shown in Figures 2 and 3.

Figures 8, 9:
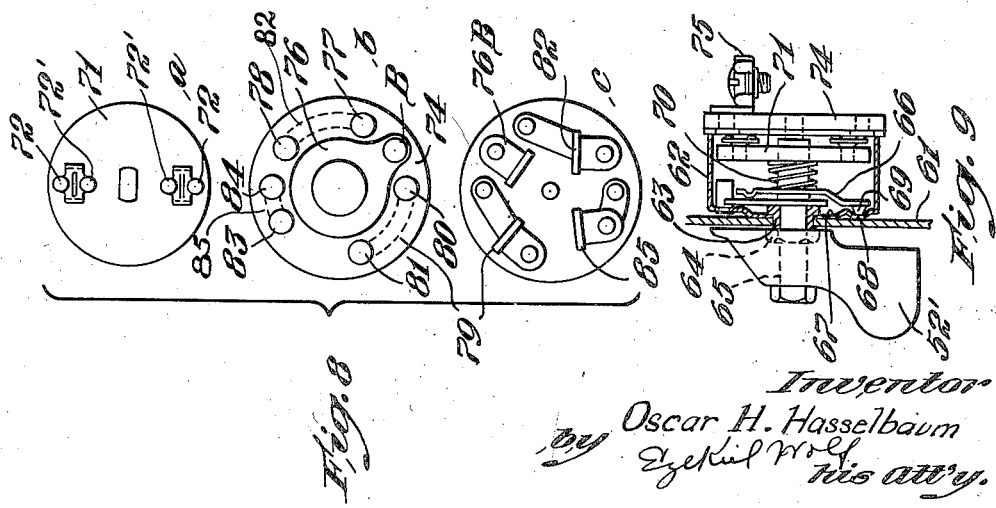

Figures 8a, b, and c show face views of elements of the switch shown in Figure 9, and Figure 9 shows a section through a single switch shown in Figure 4.

In the system illustrated in the drawings, the engineer's control panel, Figure 4, is provided with a master emergency or crash switch 51 for stopping all motors and individual motor switches 52—52 etc. remotely controlling multiple contact control switches 89 and 90. Each individual motor switch has four operative positions, namely, "off," "on," "One bank off," and "Two bank off."

Figure 1:
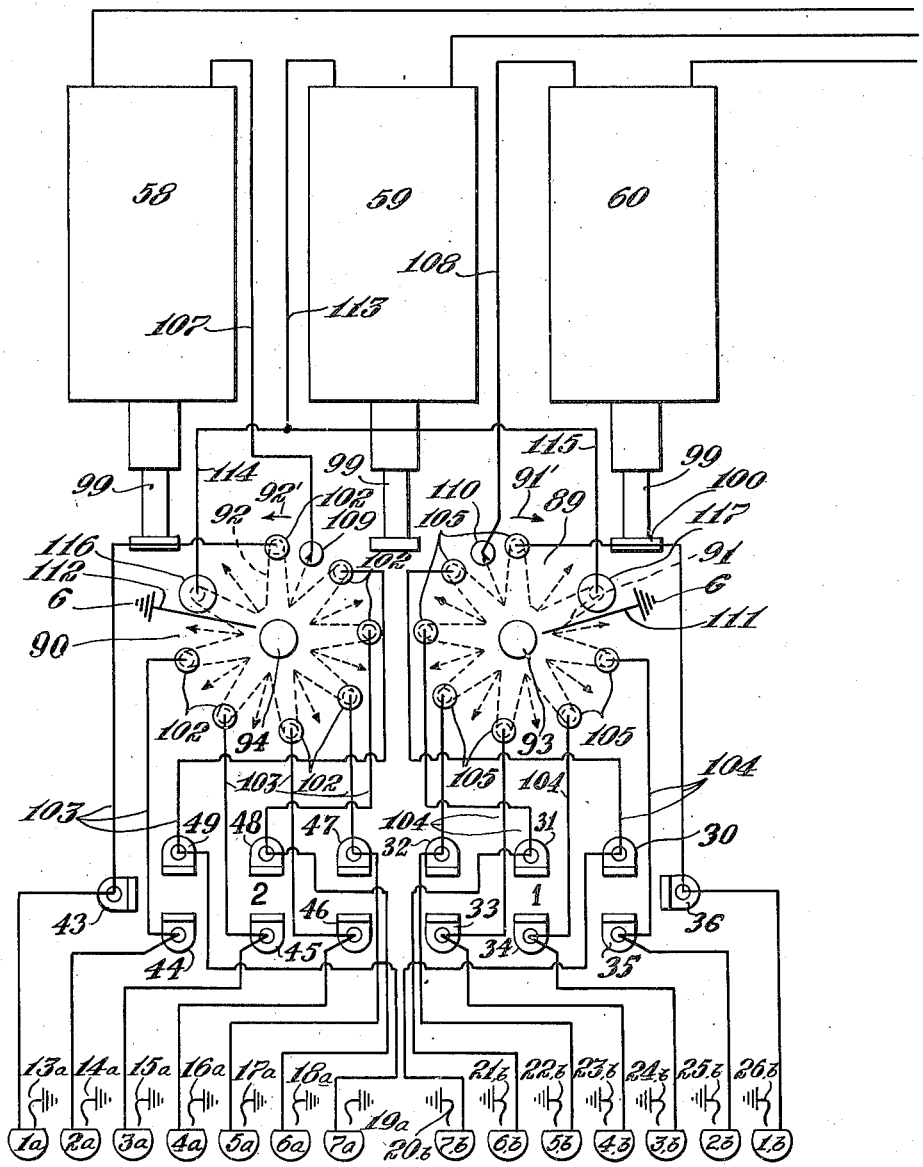
Figure 2:
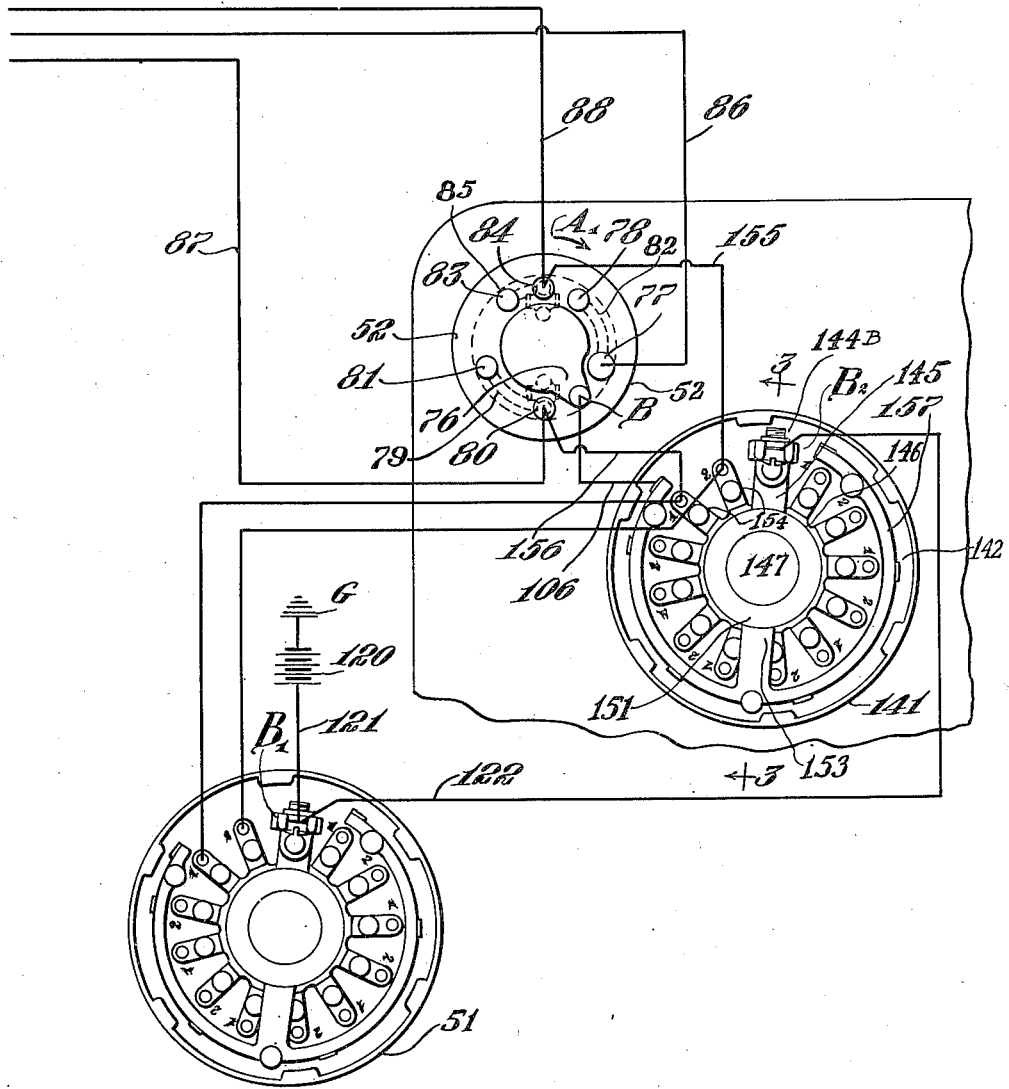
Figure 6:
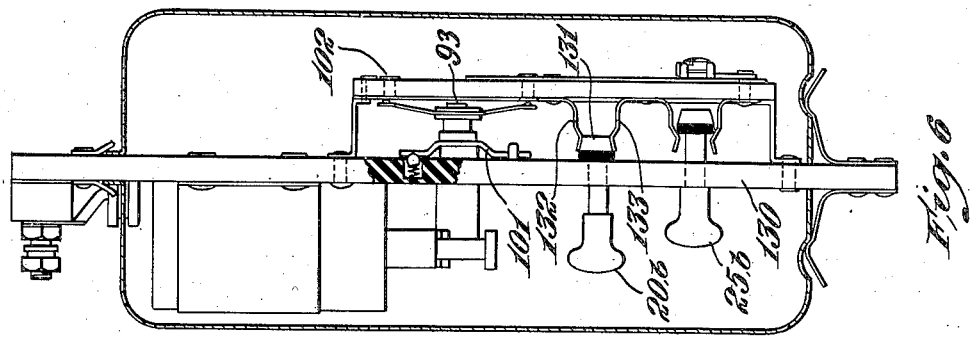
Figure 6 shows a side view of the same.

It will be noted that the switch pointer 53 in passing from the position of the "First bank off," namely the position indicated 54, goes through an intermediate position 56 half way between 54 and 55 in which, as will be shown later, both banks 1 and 2 are "on." This operation will be more readily understood by considering the diagrams of Figures 1 and 2 in connection with the operating mechanism of the solenoids 58, 59 and 60 shown in Figures 5 and 6, and the arrangement of the contacts on the switch shown in Figures 2 and 8. The wiring diagram of Figures 1 and 2 show the circuit in "off" position for one motor. The switch 52 of Figure 4 comprises the operating handle 52' which is mounted on one side of the switch panel 61 at the other side of which there is a housing 62 which is held to the panel 61 by a sleeve 63 and nut 64 on the shaft 65 which is rotated by the handle 52. Within the casing 62 mounted on the shaft 65 is a locking bar 66 which is pressed by means of a helical spring 70 against the fixed end plate 67 of the casing, which end plate is provided with recesses 68 into which the projections 69 on the bars 66 lock when the switch is moved from one position to the other. The shaft 65 also carries a rotor contact plate 71 illustrated by a in Figure 8 which has two diagrammatically opposite pairs of contact buttons 72 and 72' which make contact as they rotate with the contact studs mentioned below set in the insulating plate 74 attached to the back of the casing 62. Suitable terminal connections 75 are provided by which electrical contacts are made with external connecting leads.

On the insulating plate 74 there is embedded a contact ring 76 which is connected with the terminal 76B on the rear of the insulating plate. Also embedded in the insulating plate are two studs 77 and 78 which at the rear of the insulating plate are tied together by a single terminal 82. The studs 80 and 81 in the plate 74 are connected together at the terminal 79 in the rear of the insulating plate and the two studs 83 and 84 are connected together at the terminal 85 in the rear of the plate. The center ring 76 is connected to the power source or battery supply while the outer terminal 82 connected to contact 77 and 78 is connected to the middle solenoid 59 through the lead 86 and the outer terminal 79 connected to contacts 80 and 81 to the solenoid 60 through the lead 87. The terminal 85 has the contact plates 83 and 84 connected to the solenoid 58 through the lead 88. The rotation of the switch handle 52' of the engine control switch goes through, in its clock-wise motion, five distinct settings, the first of which is the "off" position in which the lines to the solenoids 58 and 60 are energized as far as the solenoid but no further.

In order to understand the complete circuit arrangement, the multiple contact control switches 89 and 90 must be explained. These switches are shown in Figures 1, 5 and 6. Each of these switches is provided with rotor elements 91 and 92 having eight arms spaced as indicated in Figure 1. These rotors have two positions, an "off" and an "on" position. The dotted position of the rotor arms in Figure 1 show an "off" position for the motor and the dotted arrows are the positions which the rotor arms take in the "on" positions. The motion of the rotor 92 is in the direction of the arrow 92" while the motion of the rotor 91 is in the direction of the arrow 91'. Each of the rotors 91 and 92 only move to one contact space and back again in their operation. These rotors are each operated by means of control shafts 93 and 94 (Figure 5) which have oppositely projecting arms or engaging members 95 and 96, for the shaft 93, and 97, 98 for the shaft 94 respectively.

Figure 5:
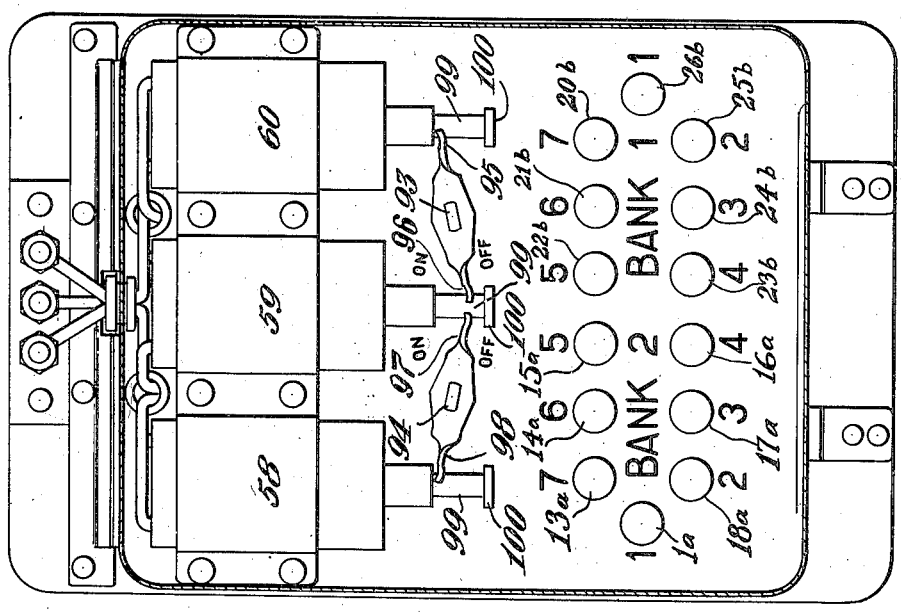
Figure 5 shows a front view of the panel switch at the motor.

Each solenoid is provided with a vertical (Figure 5) operating shaft 99 with a projecting flange 100 at the end which is adapted to engage the ends of the arms in its vertical upward motion as viewed in Figure 5. A spring, not shown, returns the shafts 99 to their extended position when the solenoid becomes deenergized which is immediately upon operation. The shaft 99 of the central solenoid 59 acts on the ends of both arms while the solenoids 58 and 60 each act only on the ends of one arm. The result of this is that operation of the solenoid 59 rotates both shafts 93 and 94 in opposite directions and the operation of the solenoids 58 and 60 restore respectively the arms individually to their original positions before the solenoid 59 operates.

The switches 89 and 90 are provided with locking spring 101 (Figure 6) so that the rotors are locked in the positions to which they are turned. The studs 102 over which the rotors wipe have leads 103, each connecting to a magneto terminal of bank No. 2 of the magneto banks which is one of the groups of magnetos used to furnish the sparks to a motor. These terminals are numbered 43 to 49 inclusive which are the primary ungrounded terminals connecting to switch positions of bank 2 labelled 7 to 1 respectively in Figure 5. The bank No. 1 has its magneto terminals 30 to 36 inclusive connected to switch positions 7 to 1 respevtively of bank 1 (see Figure 5) similarly as in bank 2. The magnetos are represented in Figure 1 by members 1a to 7a inclusive for bank No. 2 and 1b to 7b for bank No. 1. The panel of Figure 5 has the location of the ground test switches 13a to 19a inclusive correspondingly numbered 1 to 7 inclusive for the magnetos of bank No. 2, each corresponding respectively to magnetos 1a to 7a inclusive. Similarly, ground test switches 20b and 26b inclusive are provided for the magnetos of bank No. 1, from 7b to 1b respectively and the positions on the panel Figure 5 are numbered 7 to 1 respectively. The circuit therefore from the contacts of the contact switches 89 and 90 are completed to the magnetos at all times over the lines 104 and 103 respectively.

The operation of the solenoids 58, 59 and 60 control the motion of the rotors 91 and 92 as has been previously mentioned.

In the circuit diagram as shown in Figures 1 and 2, the battery supply comes to the switch 52 by means of the lead 106 connecting to the terminal B of switch 52 and thence to the annular ring 76 through the rotor contacts 72 and 72' in the position indicated in Figure 2. Current flows through the lines 87 and 88 to the solenoids 58 and 60 respectively, then through the solenoids and out by means of the leads 107 and 108 to the contacts 109 and 110 in the switches 90 and 89 respectively. Since in the position indicated in Figure 1 the wiping rotors are not contacting the contacts 109 and 110, the circuits are not completed to the solenoids 58 and 60, the circuit being opened at the switches 89 and 90.

It will be noted that the rotors 91 and 92 are grounded through ground connections 111 and 112 respectively. Since the lead 86 of the dash switch 52 to the center solenoid 59 is dead, the outgoing connector 113 and the connection 114 and 115 to the contacts 116 and 117 respectively are also dead and therefore no circuit is completed through either switch 89 or 90.

In the "off" position all the magnetos both of bank No. 1 and bank No. 2 are however grounded; the bank No. 2 over the lines 103 to the wiping rotor 92 ground terminal 112 and ground G and bank No. 1 over 104, 91, 111 and ground so that the magnetos will in this case not deliver power to the spark plugs and will therefore correspond to the engine in a dead position.

If the dash board switch 52 is moved from its "off" position to the next step, the "on" position in the direction of the arrow A1 in Figure 2, then the battery supply will be fed to the contact 78 which is connected with the contact 77 and which thereby will energize the line 86. The lines 87 and 88 will be deenergized since the rotors have moved away from contacts 80 and 84. Energizing of the line 86 will energize the solenoid 59 by circuits in the following manner. From the battery B of switch 52 through the rotor contacts 72 and 72', the contact 78, the terminal 82, the line 86, the solenoid 59, the line 113, 114 and 115, to the rotors 91 and 92 to the ground connections 111, 112, back to the battery 120 through the ground G. The circuit is completed to the battery terminal B of the switch 52 over the line 121, the battery terminal B1 of the pilot's crash switch from whence current is supplied through line 122 to terminal B2 on engineer's panel to the line 106 as will be more fully understood by a description of the crash switch itself shown in Figure 3. This energizing of the solenoid 59 causes the plunger 99 with its collar 100 (Figure 5) to be pulled up rotating the shafts 93 and 94 by contact of the arm tips 96 and 97 thereby turning the rotors 91 and 92 in the direction of the arrows 91' and 92' to the dotted arrow position indicated in Figure 1. The immediate effect of this is to break the solenoid circuit 59 so that the solenoid becomes deenergized and the spring, not shown, returns the plunger 99 of the solenoid 59 to its normal position.

In the new position the magnetos of both banks are no longer grounded through the ground terminals 111 and 112 and therefore they supply energy to the engine. In the next position of the switch 52 which is the position corresponding to the pointer 53 of the switch arm 52' pointing to bank 1 on the dial (Figure 4), one pair of rotor contacts 72, 72' of the plate 74 lie between the contacts 76 and 77 and the other pair of contacts make 72, 72' connects with the contact stud 81. Thus the battery circuit is applied over the line 87 through the solenoid 60, whereupon this solenoid core operates and the collar 100 engages the point 95 returning the rotor 91 to the dotted arm position shown in Figure 1. The rotor 92 however remains in the previous position, that is, in the dotted arrow position, since it has not been moved. Therefore turning the dash switch to bank numbered 1 energizes the solenoid 60, grounding thereby the terminals to bank No. 1 through the rotor 91. The bank No. 2 is left running and therefore each magneto may successively be tested by closing the ground switches 13a to 19a successively. Turning the switch arm 52' until the pointer 53 points to the position intermediate between 1 and 2, namely, to the center of the word "bank" in Figure 4, contact is made by the rotor points 72, 72' to the connecting line 86 and again the solenoid 59 is energized. This circuit is completed over the line 115 to the rotor 91 and to the ground G through the connection 111. The operation of the solenoid 59 then takes place and it rotates shaft 93, Figure 5, to the "on" position thereby leaving both banks running. This intermediate position prevents the shutting down of the motor although no testing is done with the switch in this position.

Further rotation of the switch arm 52' until the pointer 53 points to the numeral 2 (Figure 4) brings the rotor contact 72, 72' to the contact stud 83 thereby completing the battery supply to the line 88, energizing the solenoid 58, the circuit being completed over the line 107 to the contact stud 109 and through the wiping rotor 92 to ground through the connection 112. It will be noted that the rotor 92 was previously moved when the switch arm 52' pointed to the intermediate position making the ground connection possible. The operation of the solenoid 58 grounds all the magnetos on bank 2 shutting off this bank and leaving bank No. 1 running and therefore each magneto of bank No. 1 may be successively tested by closing the ground switches 20b to 26b inclusive.

The switch arm 52' may be moved back to any position desired, the successive positions of the switch arm operating in each case as previously described.

As has been previously stated, the solenoids 58, 59 and 60 and the rotor switches operated thereby, together with the bank terminals and the testing switches for the magnetos are preferably located on the panel 130 in the motor bay. The switches for bank 1, numbered 1 to 7 on Figure 5, correspond to the ground switches 20b and 25b of Figure 1. To test any magneto, these ground switches are pulled out as indicated by 20b in Figure 6. Pulling the switch jack out provides a connection 131 between the spring contacts 132 and 133.

The construction of the pilot's crash or master switch and the engineer's emergency switch are shown in Figures 2, 3 and 7. In Figure 2 the pilot's crash switch 51 and the second emergency or crash switch 141 are wired in parallel and are of the same construction except that provision is made in the pilot's switch for directly opening the main line feed in the switch operation.

As indicated in Figures 2 and 3 these switches comprise an insulating plate 142 with a cover 143 covering one side of the insulating plate. A main battery terminal connection 144B comprises an angle member which is riveted to the insulating plate and which is provided with a U shaped leaf spring member 145 bearing against a centrally positioned conducting cylinder 146 mounted on the pull shaft 147 connected to the knob 148 at the front of the switch panel 149 on which the whole switch elements 140 and 141 may be mounted. A suitable collar 149' and threaded nut 150 may hold the switch in place.

The centrally conducting collar 146 is provided at each end with insulating plates 151 and 152, the whole element forming the jack of the switches 51 or 141. When the jack is in an "in" position, the spring brush connector 145 and the spring brush connector 153 bear against the conducting collar 146. The spring brush 153 connects to the ring 157 to the B battery or battery terminal of the individual motor switches 52. Where therefore the pilot's crash switch serves for six motors there are six of such B battery terminals connected as illustrated by the connecting line 106 in Figure 2. All of the individual switches 52 therefore are connected to the connecting ring 157 which is energized when the jack is in an "in" position. In the "in" position of the jack, the spring brush 154 of the switch 51 or 141 which extends inwardly within the casing 143 bears against the insulating ring 152 and therefore is not energized. These spring brushes 154 are identified as the brushes labelled 1, 2, in the switches 51 and 141 shown in Figure 2. These brushes 154, it will be noted, are not energized when the switch jack is in the innermost position but as it is pulled outward the conducting collar 146 connects the U shaped brush 145 with all of the 1, 2, terminals energizing all the lines connected thereto. This action energizes the lines 155 and 156 connected to the terminals 2, 1, respectively of the switches 140 and 141, which action immediately energizes the lines 87 and 88 thus operating the solenoids 58 and 60 thereby grounding all of the magnetos and stopping the motors. This action, it will be seen, will take place regardless of the position of the individual control switches for each motor. A very small movement of the master or crash switch will bring about this action, first by opening the battery feed, that is the connection between the switch 145 and 153, and then by connecting all 1, 2, terminals to the supply line. During the latter part of the motion, the jack disconnects the switch blades 145 and 154 thus opening all of the 1, 2, terminals and leaving the lines 86 and 87 for each solenoid group deenergized. The system is then completely dead until such time as the emergency pull is pushed back again. In the final position of the pilot's switch, however, as indicated more clearly in Figure 7, the main battery line between B (in) and B (out) is broken when the flange 160 on the extension 161 of the shaft 148 bears against the plate 162 and opens both contacts 163 and 164 so that a double precaution is taken to break the main feed line. The pilot's crash switch and the second crash switch, as indicated in Figure 2, are connected in parallel so far as the 1, 2, terminals and the battery terminal. The battery terminal of the pilot's crash switch is provided with the main battery leads which in the pull out are broken at this point.

Since the operation of the system has been described in connection with the description of the circuits and elements, there is no need of further description of the operation of the system. It will be understood that this arrangement may be applied to any number of motors, one or a multiple thereof, the circuit of Figures 1 and 2 being shown complete, however, only for one motor, while the panel of Figure 4 shows the circuit complete with six motors and a single emergency pull out switch. The arrangement described enables tests to be made individually on each magneto and its circuit in the usual manner of listening for change of motor speed due to the failure of a magneto or its ignition circuit. The test may be made by grounding or shorting out one or more circuits in the usual and known way.

Having now described my invention, I claim:

1. A switching system for multiple ignition circuits used in one or more combustion motors for testing and remote control thereof, comprising in combination a master switch controlling the electrical power supply, a motor switch energized therethrough, remotely controlled switches operated by said motor switch providing selective on and off relations of the multiple ignition circuits and individual test switches for testing each ignition supply and circuit.

2. A switching system for multiple ignition circuits used in one or more combustion motors for testing and remote control thereof, comprising in combination a master switch controlling the electrical power supply, a motor switch energized therethrough having connecting positions operating to short out said ignition circuits in groups, in whole or not at all, remotely controlled switches operated by said motor switches for bringing about said named operations and individual test switches operable to test each ignition supply and circuit.

3. A switching system for multiple ignition circuits used in one or more combustion motors for testing and remote control thereof, comprising in combination a master switch controlling the electrical power supply, a motor switch energized therethrough having connection positions operating to short out said ignition circuits in groups, in whole, or not at all, remotely controlled switches operated by said motor switches for effecting said named operations and means included in said master switch for effecting the shorting out of said ignition circuits without regard to the operation of said motor switch.

4. A switching system for multiple ignition circuits used in one or more combustion motors for testing and remote control thereof, comprising in combination a motor switch having connecting positions operating to short out said ignition circuits in groups, in whole or not at all, remotely controlled switches operated by said motor switches for bringing about said named operations and individual test switches operable to test each ignition supply and circuit.

5. A switching system for multiple ignition circuits used in one or more combustion motors for testing and remote control thereof, comprising in combination a motor switch having connecting positions operating to short out said ignition circuits in groups, in whole or not at all, remotely controlled switches operated by said motor switches for bringing about said named operations comprising solenoid means, rotor switch means operated thereby having two positions, one for shorting out a group of said ignition circuits and the other for shorting out all said test circuits and individual ignition switches operable to test each ignition supply and circuit.

6. A switching system for multiple ignition circuits used in one or more combustion motors for testing and remote control thereof, comprising in combination a motor switch having connecting positions operating to short out said ignition circuits in groups, in whole or not at all, remotely controlled switches operated by said motor switches for bringing about said named operations comprising solenoid means, rotor switch means operated thereby having three positions, one for shorting out one group of said ignition circuits only, a second for shorting out all said ignition circuits, and a third for shorting out none of said ignition circuits.

7. A switching system for multiple ignition circuits used in one or more combustion motors for testing and remote control thereof, comprising in combination a motor switch having connecting positions operating to short out said ignition circuits in groups, in whole or not at all, remotely controlled switches operated by said motor switches for bringing about said named operations comprising solenoid means, a plurality of rotor switch means operated thereby, each having two operating positions established by said solenoid means, one of said positions for each rotor effecting the shorting out of one group of said ignition circuits and the other effecting the operation of said group of said ignition circuits.

8. A switching system for multiple ignition circuits used in one or more combustion motors for testing and remote control thereof, comprising in combination a motor switch having connecting positions operating to short out said ignition circuits in groups, in whole or not at all, remotely controlled switches operated by said motor switches for bringing about said named operations comprising solenoid means, a plurality of rotor switch means operated thereby, each having two operating positions established by said solenoid means, one of said positions for each rotor effecting the shorting out of one group of said ignition circuits and the other effecting the operation of said group of said ignition circuits and individual testing switches for testing each ignition supply.

9. A switching system for multiple ignition circuits used in one or more combustion motors for testing and remote control thereof, comprising in combination a motor switch having connecting positions operating to short out said ignition circuits in groups, in whole or not at all, remotely controlled switches operated by said motor switches for bringing about said named operations comprising solenoid means, a plurality of rotor switch means operated thereby, each having two operating positions established by said solenoid means, one of said positions for each rotor effecting the shorting out of one group of said ignition circuits and the other effecting the operation of said group of said ignition circuits and master switch means for effecting the operation of said solenoid means for effecting the shorting out of both groups of said ignition circuits.

10. A switching system for multiple ignition circuits used in one or more combustion motors for testing and remote control thereof, comprising in combination a motor switch having connecting positions operating to short out said ignition circuits in groups, in whole or not at all, remotely controlled switches operated by said motor switches for bringing about said named operations comprising three solenoids, two rotor switches, one of said solenoids connected to operate both rotor switches and said other two solenoids connected to operate each one of said rotor switches, opposite in direction to the operation of said rotor switches by said first solenoid, the position of said rotor switches shorting out or not shorting out a group of said ignition circuits.

11. A switching system for multiple ignition circuits used in one or more combustion motors for testing and remote control thereof, comprising in combination a motor switch having connecting positions operating to short out said ignition circuits in groups, in whole or not at all, remotely controlled switches operated by said motor switches for bringing about said named operations comprising three solenoids, two rotor switches, one of said solenoids connected to operate both rotor switches and said other two solenoids connected to operate each one of said rotor switches, opposite in direction to the operation of said rotor switches by first said solenoid, the position of said rotor switches shorting out or not shorting out a group of said ignition circuits and individual testing switches for each ignition circuit.

12. In a switching system of the type described in combination a master switch, a motor switch, said latter having a plurality of operating positions for operating remote control means, means for feeding an electrical supply source through said master switch to said motor switch in one position thereof and means in the other position thereof for operating directly said remote control means.

13. In a switching system of the type described in combination a master switch, a motor switch, said latter having a plurality of operating positions for operating remote control means, means for feeding an electrical supply source through said master switch to said motor switch in one position thereof and means in the other position thereof for operating directly said remote control means; said master switch comprising a jack member having a cylindrical contact section, and insulated switch blades bearing against said cylinder in spaced positions thereof along the axial movement of said cylinder, only two groups of contacts bearing against said cylinders at any one time.

14. In a switching system of the type described in combination a master switch, a motor switch, said latter having a plurality of operating positions for operating remote control means, means for feeding an electrical supply source through said master switch to said motor switch in one position thereof and means in the other position thereof for operating directly said remote control means; said master switch comprising a jack member having a cylindrical contact section, and insulated switch blades bearing against said cylinder in spaced positions thereof along the axial movement of said cylinder, one group of contacts for feeding electrical power to said motor switch and the other for eliminating the operation of said motor switch.

15. In a switching system of the type described, a motor switch having an "off" position, two "on" positions and "off" positions for portions of the circuits in the system, comprising a static element consisting of an insulating plate with a contact ring imbedded therein and contact studs also imbedded in said plate, and a rotor element serving as a connecting link between said studs and said rings, a handle for operating said rotor and spring means having a bearing member on one side and said rotor on the other side for maintaining tight contact of said rotor on said plate.

16. In a switching system of the type described, a motor switch having an "off" position, two "on" positions and "off" positions for portions of the circuits in the system, comprising a static element consisting of an insulating plate with a contact ring imbedded therein and contact studs also imbedded in said plate, and a rotor element serving as a connecting link between said studs and said rings, a handle for operating said rotor and spring means having a bearing member on one side and said rotor on the other side for maintaining tight contact of said rotor on said plate; said bearing member having a projecting detent element and a casing providing spaced recess into which said detent locks for each position of said handle.

OSCAR H. HASSELBAUM.